United States Patent
Pasanen et al.

(10) Patent No.: US 7,423,993 B2
(45) Date of Patent: Sep. 9, 2008

(54) CONNECTION RELEASE IN COMMUNICATION NETWORK

(75) Inventors: Juha T. Pasanen, Espoo (FI); Pekka Anttalainen, Helsinki (FI)

(73) Assignee: Nokia Corporation, Espoo (FI)

( * ) Notice: Subject to any disclaimer, the term of this patent is extended or adjusted under 35 U.S.C. 154(b) by 1097 days.

(21) Appl. No.: 10/437,917

(22) Filed: May 15, 2003

(65) Prior Publication Data

US 2004/0156338 A1 Aug. 12, 2004

Related U.S. Application Data

(60) Provisional application No. 60/445,839, filed on Feb. 10, 2003.

(51) Int. Cl.
*H04Q 7/00* (2006.01)
*H04L 12/28* (2006.01)
*H04L 12/56* (2006.01)

(52) U.S. Cl. .................................... 370/331; 370/338

(58) Field of Classification Search ................ 370/352, 370/395.2, 331, 216, 221, 241, 241.1, 242, 370/245, 252, 338
See application file for complete search history.

(56) References Cited

U.S. PATENT DOCUMENTS

| | | | |
|---|---|---|---|
| 7,046,992 B2 * | 5/2006 | Wallentin et al. | 455/411 |
| 2001/0034228 A1 * | 10/2001 | Lehtovirta et al. | 455/424 |
| 2002/0168984 A1 * | 11/2002 | Wallentin | 455/452 |
| 2006/0234706 A1 * | 10/2006 | Wallentin | 455/436 |

FOREIGN PATENT DOCUMENTS

| | | |
|---|---|---|
| GB | 2 371 179 A | 7/2002 |
| WO | WO 01/28124 A1 | 4/2001 |
| WO | WO 01/89251 A1 | 11/2001 |
| WO | WO 02/17664 A1 | 2/2002 |
| WO | WO 02/28130 A2 | 4/2002 |

(Continued)

OTHER PUBLICATIONS

3GPP TS 23.060 V3.14.0, "$3^{rd}$ *Generation Partnership Project; Technical Specification Group Services and System Aspects; General Packet Radio Service (GPRS); Service Description; Stage 2 (Release 1999)*", Global System for Mobile Communication, Dec. 2002, pp. 1-193.

(Continued)

*Primary Examiner*—Seema S. Rao
*Assistant Examiner*—Christine Duong
(74) *Attorney, Agent, or Firm*—Squire, Sanders & Dempsey, L.L.P.

(57) ABSTRACT

A communication management mechanism for a communication network, in which the core network determines whether a user equipment, which was connected to the core network via an access network subsystem, is still reachable via a signaling connection to this specific access network subsystem when a connection release procedure is to be performed. When it is determined that the access network subsystem is assumed by the core network to not be able to reach via a signaling connection the user equipment, an indication element is generated which indicates the result of the core network that the user equipment can not be reached by the access network subsystem via this hitherto signaling connection. This indication element is transmitted to the access network, for example, in connection with a connection release command.

31 Claims, 3 Drawing Sheets

FOREIGN PATENT DOCUMENTS

WO      WO 03/001830      1/2003

OTHER PUBLICATIONS

3 GPP TS 25.413 V5.2.0, "*3rd Generation Partnership Project; Technical Specification Group Radio Access Network; UTRAN Iu Interface RANAP Signalling (Release 5)*", Sep. 2002, pp. 1-230.

3 GPP TS 25.331, V3.14.0, "*3rd Generation Partnership Project; Technical Specification Group Radio Access Network; Radio Resource Control (RRC) Protocol Specification (Release 1999)*", Mar. 2003, pp. 1-861.

* cited by examiner

CONNECTION RELEASE IN COMMUNICATION NETWORK

CROSS REFERENCE TO RELATED APPLICATION

This application claims the benefit of the filing date of Provisional Patent Application Ser. No. 60/445,839, filed on Feb. 10, 2003, entitled "Connection Release in Communication Network", which application is incorporated herein by reference in its entirety.

BACKGROUND OF THE INVENTION

1. Field of the invention

The present invention relates to a method and/or a system and/or network devices for managing communication connections of a user equipment in a communication network. More particularly, the present invention relates to a method and/or a system and/or network devices providing an improved mechanism to release connections of a user equipment to the communication network when a communication session between the user equipment and elements of the communication network is to be ended.

2. Description of the Prior Art

Recently, an increasingly extension of communication networks, in particular of wireless cellular communication networks all over the world is taking place. Various organizations, such as the $3^{rd}$ Generation Partnership Project (3GPP), the International Telecommunication Union (ITU), $3^{rd}$ Generation Partnership Project 2 (3GPP2), Internet Engineering Task Force (IETF), and the like are working on standards for telecommunication networks and multiple access environments, such as GSM (Global System for Mobile communications), GPRS (General Packet Radio System), $3^{rd}$ generation systems such as UMTS (Universal Mobile Telecommunications System), Wireless Local Area Network (WLAN), cdma2000 (code division multiple access) and the like.

In general, the system structure of a communication network is such that a subscriber's user equipment, such as a mobile station, a mobile phone, a fixed phone, a personal computer (PC), a laptop, a personal digital assistant (PDA) or the like, is connected via transceivers and interfaces, such as an air interface, a wired interface or the like, to an access network subsystem. The access network subsystem controls the communication connection to and from the user equipment and is connected via an interface to a corresponding core network system. The core network subsystem switches the data transmitted via the communication connection to a destination, such as another user equipment or another communication network. It is to be noted that the core network subsystem may be connected to a plurality of access network subsystems. Depending on the used communication network, the actual network structure may vary, as is known and defined in respective specifications, for example, for UMTS, GSM and the like.

Communication systems may operate on the basis of different transmission types. For example, a circuit switched (CS) communication and/or a so-called packet switched (PS) communication can be implemented, which are commonly known. Depending on the type the user equipment may simultaneously use both CS and PS communications, or either CS or PS communications at a time, or exclusively only one of CS or PS communications. Alternatively or additionally, there may be provided communication network structures operating on different communication frequency bands. Similarly, the user equipments may then communicate on one or both of these frequency bands.

In the case of a cellular mobile communication network, such as GSM or UMTS, the access network subsystems comprise specific areas, so-called cells, in which the user equipment is located. For example, the mobile communication network is designed to allow both a CS and/or a PS communication. One or more cells are covered by one or more transceiver station, for example a base transceiver station BTS (in case of GSM) or a Node B (in case of UMTS), via which the user equipment is connected to the network. A controller, such as a GSM base station controller (BSC) or a UMTS radio network controller (RNC), is provided in the access network subsystem for controlling one or more cells. In the case of a UMTS network, the access network is called UMTS Terrestrial Radio Access Network UTRAN which comprises one or more Radio Network Subsystems (RNS), while the GSM access network comprises one or more Base Station Subsystem BSS. Depending on the communication type (CS or PS) which is used, the access network controller transmits the user equipment's data to a corresponding core network control element, that is a Mobile Switching Center (MSC) in a CS case or a Serving GPRS (General Packet Radio Service) Support Node (SGSN), to which it is connected.

Current network structures may be designed to comprise types of communication systems (multi-type communication networks). For example, a combination of GSM, GPRS and UMTS network systems in one communication network is planned. This means, for example, that GSM, GPRS ($2^{nd}$ generation) as well as UMTS ($3^{rd}$ generation) access network structures, such as BSSs and RNSs, are controlled by a combined core network comprising $2^{nd}$ generation as well as $3^{rd}$ generation core network elements, such as SGSNs and MSCs.

For the establishment of a communication path for a user equipment in the communication network to a destination, connections and resources in the communication network are provided between the user equipment and the core network subsystem via the respective interfaces. This includes, for example, the allocation of one or more radio access bearers (RAB), and the like, to the communication session.

In the case of a UMTS communication network, for example, the user equipment is connected to a UTRAN RNS through a so-called Uu interface to a Node B and from there to the corresponding RNC. The connection of the user equipment to the UTRAN comprises a Radio Resource Control (RRC) connection providing signaling capability between them. An UTRAN RNC is connected to the core network through a so-called Iu interface. Depending on the connection type (CS or PS), the link of the connection path leads to a core network's SGSN or MSC. For the signaling between the UTRAN and the core network, i.e. for the Iu interface, Radio Access Network Application Part (RANAP) is used. RANAP supports the functions of Iu interface by signaling procedures as described, for example, in the 3GPP specification TS 25.413 V5.2.0 (September 2002). RANAP comprises, for example, control information for the radio network layer of the UTRAN protocol and basic control procedures. Amongst others, the RANAP protocol has the following functions:

Relocating serving RNC. This function enables to change the serving RNC functionality as well as the related Iu resources (RAB(s) and Signaling connection) from one RNC to another.

Overall RAB (Radio Access Bearer) management. This function is responsible for setting up, modifying and releasing RABs.

Release of all Iu connection resources. This function is used to explicitly release all resources related to one Iu connection.

These functions are implemented by one or several RANAP elementary procedures described, for example, in the 3GPP specification TS 25.413 V5.2.0.

When a session between the user equipment and the core network is to be ended, connections and resources in the communication network for the user equipment are released. This includes a release of the Iu interface. This Iu release procedure enables the core network (for example the serving SGSN, MSC) to release the Iu connection and UTRAN resources related to a specific Iu connection of a user equipment. It can be initiated on the core network side, for example, due to a completion of transaction between the user equipment and the core network, UTRAN generated reasons such as a release request from the UTRAN (for example due to an unspecified failure, user inactivity, loss of radio connection with UE and the like), the completion of a successful relocation of the serving radio network subsystem, and the like.

Figure 3:
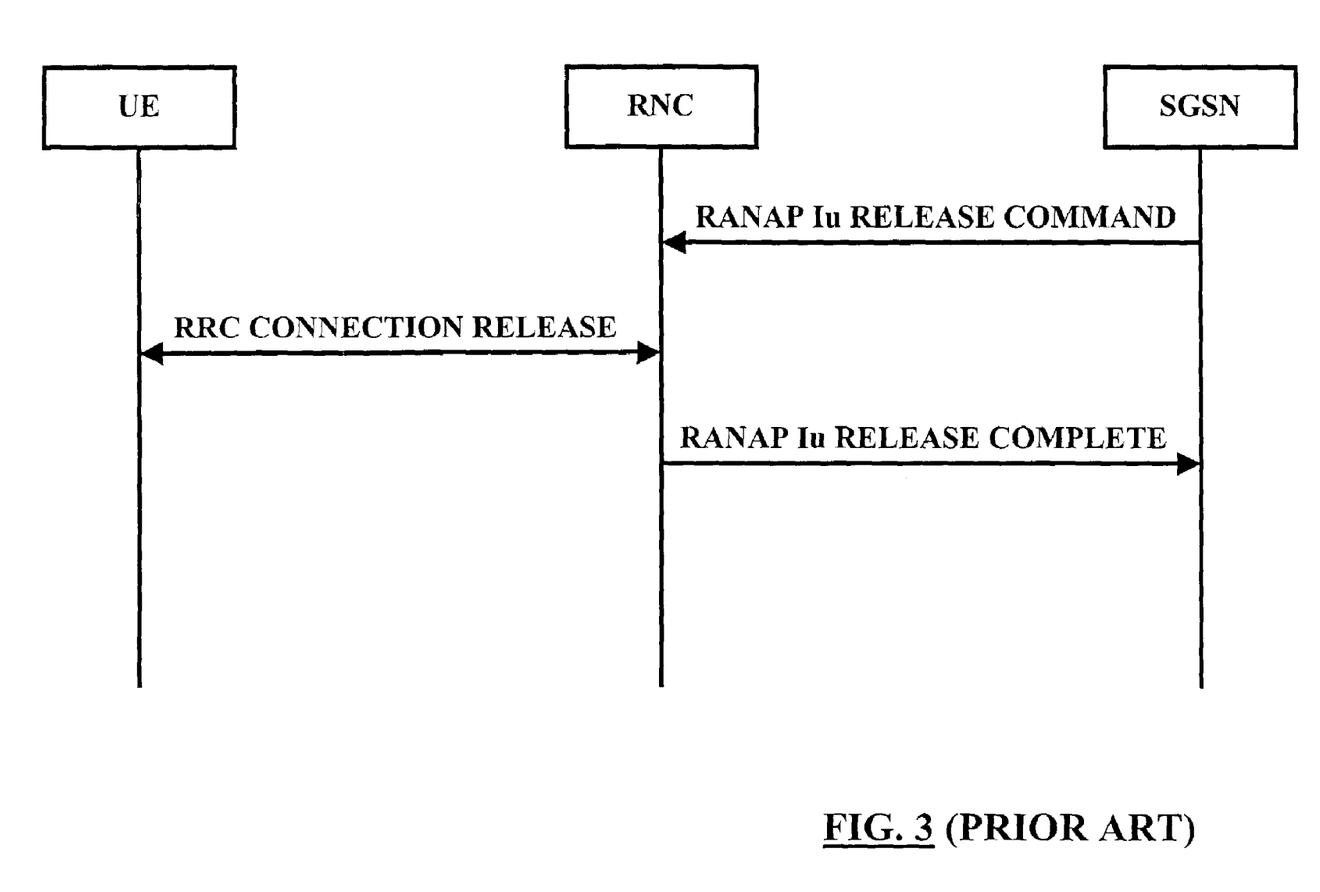
FIG. 3 shows a signaling diagram illustrating a conventional connection release procedure.

Referring to FIG. 3, the release procedure for user equipment connections is described by means of a signaling flow. In this example, a PS connection is assumed. The core network's (serving) SGSN releases the Iu and the user equipment by sending a RANAP Iu release command message to the RNC. If there is no connection to the other core network, the normal procedure is that without any conditions the RNC releases the resources related to the signaling connection and the user equipment. In other words, the RNC can release the RRC connection if no (other) Iu signaling connection remains. For example, if the SGSN sends the RANAP Iu Release Command, but the UE still has an Iu signaling connection towards the MSC, then the RNC must not send RRC Connection Release to the UE, but informs the release of the SGSN (PS domain) signaling connection otherwise to the UE since the MSC may still need the RRC Connection. When the MSC sends RANAP Iu Release Command and there is no Iu signaling connection towards the SGSN anymore, then the RNC can send a RRC Connection Release to the UE, because no Iu signaling connection remains. This means that the RNC executes also a RRC connection release procedure by transmitting and receiving corresponding messages to and from the related user equipment in order to release the user equipment resources in good cooperation with the user equipment. A corresponding procedure is described, for example, in the 3GPP specification TS 25.331. In other words, after receipt of the Iu release command message, the RNC clears related UTRAN resources and returns any assigned Iu user plane resources to idle. Furthermore, the RNC sends a RANAP Iu release complete message to the core network (here the SGSN), by which the release procedure is terminated. Even though FIG. 3 shows the transmission of the RANAP Iu release complete message after the completion of the RRC release procedure, it is also possible that the RNC must not necessarily await the result of the RRC connection release before a confirmation for the Iu release can be transmitted to the core network.

However, this connection managing procedure for releasing a connection of a user equipment with the core network entails a load for the radio path and requires a specific capacity of the involved network elements and interfaces. In particular in a situation where the user equipment is not reachable for the UTRAN via which the core network and the user equipment were connected to each other hitherto, a waste of resources may take place.

SUMMARY OF THE INVENTION

Thus, it is desirable to provide an improved method and/or system and/or network devices which are usable for managing a communication connection of a user equipment in a communication network.

In particular, it is desirable to provide an improved method and/or system and/or network devices by means of which an improved connection release procedure for a user equipment can be effected when a communication session between the user equipment and the core network is to be ended.

According to one aspect of the invention, there is provided, for example, a method of managing a communication connection of a user equipment in a communication network, the communication network comprising a plurality of access network subsystems each of which covering a specific area in the communication network and comprising first control means for controlling the communication connection to and from the user equipment, and a core network subsystem comprising second control means for controlling the communication connection to and from the access network subsystems, wherein the user equipment has at least one first signaling connection to one of the access network subsystems via a first interface, and the core network subsystem is connected to each of the plurality of access network subsystems via a respective second interface, wherein for the at least one first signaling connection of the user equipment at least one second signaling connection between the access network subsystem and the core network subsystem is established via the second interface, wherein, when the core network subsystems determines that a communication connection related to the user equipment via the at least one second signaling connection is to be terminated, the method comprises the steps of processing, in the second control means, received signaling information related to the user equipment in order to determine whether or not the user equipment is still reachable via the at least one first signaling connection for the access network subsystem through which the user equipment was connected hitherto; and sending, if the result of the determination is NO, a specific indication element from the second control means to the first control means of the access network subsystem via the second interface, wherein the specific indication element indicates that the user equipment is not reachable for the access network subsystem via the at least one first signaling connection.

Furthermore, according to one aspect of the invention, there is provided, for example, a system for managing a communication connection of a user equipment in a communication network, the communication network comprising a plurality of access network subsystems each of which covering a specific area in the communication network and comprising first control means for controlling the communication connection to and from the user equipment, and a core network subsystem comprising second control means for controlling the communication connection to and from the access network subsystems, wherein the user equipment has at least one first signaling connection to one of the access network subsystems via a first interface, and the core network subsystem is connected to each of the plurality of access network subsystems via a respective second interface, wherein for the at least one first signaling connection of the user equipment at least one second signaling connection between the access network subsystem and the core network subsystem is established via the second interface, wherein, when the core network subsystems determines that a communication connection related to the user equipment via the at least one second signaling connection is to be terminated, the system comprises a processing unit for processing, in the second control means, received signaling information related to the user equipment, the processing unit determines whether or not the user equipment is still reachable via the at least one first signaling connection for the access network subsystem through which the user equipment was connected hitherto, wherein, if the result of the determination is NO, a specific indication element is generated by the processing unit and transmitted from the second control means to the first control means of the access network subsystem via the second interface, wherein the specific indication element indicates that the user equipment is not reachable for the access network subsystem via the at least one first signaling connection.

Moreover, according to one aspect of the invention, there is provided, for example, a core network device usable for managing a communication connection of a user equipment in a communication network, the communication network comprising a plurality of access network subsystems each of which covering a specific area in the communication network and comprising first control means for controlling the communication connection to and from the user equipment, and a core network subsystem comprising second control means for controlling the communication connection to and from the access network subsystems, wherein the user equipment has at least one first signaling connection to one of the access network subsystems via a first interface, and the core network subsystem is connected to each of the plurality of access network subsystems via a respective second interface, wherein for the at least one first signaling connection of the user equipment at least one second signaling connection between the access network subsystem and the core network subsystem is established via the second interface, wherein, when the core network subsystems determines that a communication connection related to the user equipment via the at least one second signaling connection is to be terminated, the core network device processes received signaling information related to the user equipment in order to determine whether or not the user equipment is still reachable via the at least one first signaling connection for the access network subsystem through which the user equipment was connected hitherto;, wherein, if the result of the determination is NO, a specific indication element is generated and transmitted from the second control means to the first control means of the hitherto access network subsystem via the second interface, wherein the specific indication element indicates that the user equipment is not reachable for the access network subsystem via the at least one first signaling connection.

Additionally, according to one aspect of the invention, there is provided, for example, an access network device usable for managing a communication connection of a user equipment in a communication network, the communication network comprising a plurality of access network subsystems each of which covers a specific area in the communication network and comprising first control means for controlling the communication connection to and from the user equipment, and a core network subsystem comprising second control means for controlling the communication connection to and from the access network subsystems, wherein the user equipment has at least one first signaling connection to one of the access network subsystems via a first interface, and the core network subsystem is connected to each of the plurality of access network subsystems via a respective second interface, wherein for the at least one first signaling connection of the user equipment at least one second signaling connection between the access network subsystem and the core network subsystem is established via the second interface, wherein, when the core network subsystems determines that a communication connection related to the user equipment via the at least one second signaling connection is to be terminated and that the user equipment is not reachable via the at least one first signaling connection for the access network subsystem to which the user equipment was connected hitherto, a specific indication element transmitted from the second control means to the first control means of the access network subsystem is received via the second interface, wherein the access network element recognizes that the specific indication element indicates that the user equipment is not reachable for the access network subsystem via the at least one first signaling connection and to prevent a communication to the user equipment through the at least one first signaling connection via the first interface in response to the indication element.

According to further refinements, the invention comprises one or more of the following features:

the indication element may be a specific cause code included in a signaling message transmitted from the second control means to the first control means of the access network subsystem via the respective second interface;

the specific indication element may be transmitted to the first control means of the access network subsystem by means of a connection release message for releasing the at least one second signaling connection of the user equipment to the core network subsystem via the second interface;

in response to the receipt of the indication element, a communication to the user equipment through the at least one first signaling connection via the first interface may be prevented in the access network subsystem;

the first control means may release connection resources related to the communication connection of the user equipment;

the determination that the user equipment is not reachable for the access network subsystem via the at least one first signaling connection may be performed by detecting that a signaling related to the user equipment is forwarded via an interface between the core network subsystem and an access network subsystem being different to the hitherto access network subsystem;

the determination that the user equipment is not reachable for the access network subsystem via the at least one first signaling connection may also be performed by detecting that a signaling related to the user equipment is forwarded via a third interface between the second control means of the core network subsystem and other core network subsystem's control means;

the determination that the user equipment is not reachable for the access network subsystem via the at least one first signaling connection may also be performed by detecting that a signaling related to the user equipment is forwarded via the second interface between the core network subsystem and the same access network subsystem by means of another second signaling connection.

the communication network subsystem may comprise UMTS functionality, wherein the core network subsystem's control means comprise a SGSN entity, the access network subsystems comprise UTRAN and/or GSM access network subsystems, such as RNS and BSS, and/or combinations thereof, and the access network subsystem's control means comprise base station controllers and radio network controllers, respectively, wherein the user equipment communicates with both the UTRAN and/or the GSM access network subsystems.

The following advantages are the result of the invention:
The invention is easy to implement in already existing communication networks. For example, by adapting processing functions of central communication network elements (e.g. SGSN, RNC, BTS) and implementing new data elements or changing already existing data elements, for example by means of software changes, the communication connection management in the access network and core network sides can be improved in the proposed way. It is also possible to make network elements in accordance with the invention compatible with network elements which are not adapted accordingly, for example, by using data elements which can be ignored by the conventional network elements.

When the core network side, for example at a control entity like the SGSN, becomes aware that the user equipment can not be reached anymore beyond the hitherto used interface to an access network subsystem, such as an UTRAN subsystem, for example due to a relocation of the user equipment to another access network subsystem or a connection change within the same or to another access network subsystem, the (hitherto) access network subsystem can be informed by a corresponding indication about this fact. Thus, when this indication is recognized at the access network side, the controller thereof is able to prevent useless signaling to the user equipment. Therefore, radio and processing capacity at the access network side, such as in the access network controller (e.g. RNC), transceiver elements (e.g. Node B, BTS), and transmission interface (e.g. radio interface like Uu), can be saved.

By means of this indication, it is possible to improve the connection management and signaling in the access network subsystem with regard to a plurality of signaling procedures related to the user equipment to be released. For example, useless paging trials over the interfaces between the access network subsystem and the user equipment can be avoided. In particular in a paging channel (PCH) case this is advantageous since the access network does not have to start paging procedure before that (in addition to an actual connection release, for example). Furthermore, useless connection release trials, such as a RRC connection release signaling trial, over the interfaces between the access network subsystem and the user equipment can be avoided. Also useless reset operations trials between peer entities, that is the user equipment and those of the access network subsystem, can be avoided, such as Radio Link Control (RLC) resets. Other signaling procedures related to a connection release of a user equipment may also be avoided or modified in a similar manner.

By implementing the connection management mechanism of the invention, it is possible to achieve improved and more realistic radio performance statistics. When the user equipment has changed, for example, its location (i.e. access network) without the knowledge of the hitherto access network, this does not represent a failure situation, but may be looked upon as a normal situation. However, an unsuccessful trial of the (hitherto) access network to reach the user equipment (which is in fact useless, for example, due to the relocation of the user equipment) increments, for example, a failure counter counting an event "no radio contact to user equipment", or the like. This in turn may deteriorate radio performance statistics even though actually no failure occurred. Hence, by providing such an indication to the access network controller that the user equipment must not be contacted anymore, the avoidance of useless signaling is achieved which would otherwise considered by failure counters.

The above and still further objects, features and advantages of the invention will become more apparent upon referring to the description and the accompanying drawings.

DESCRIPTION OF PREFERRED EMBODIMENTS

Figure 1:
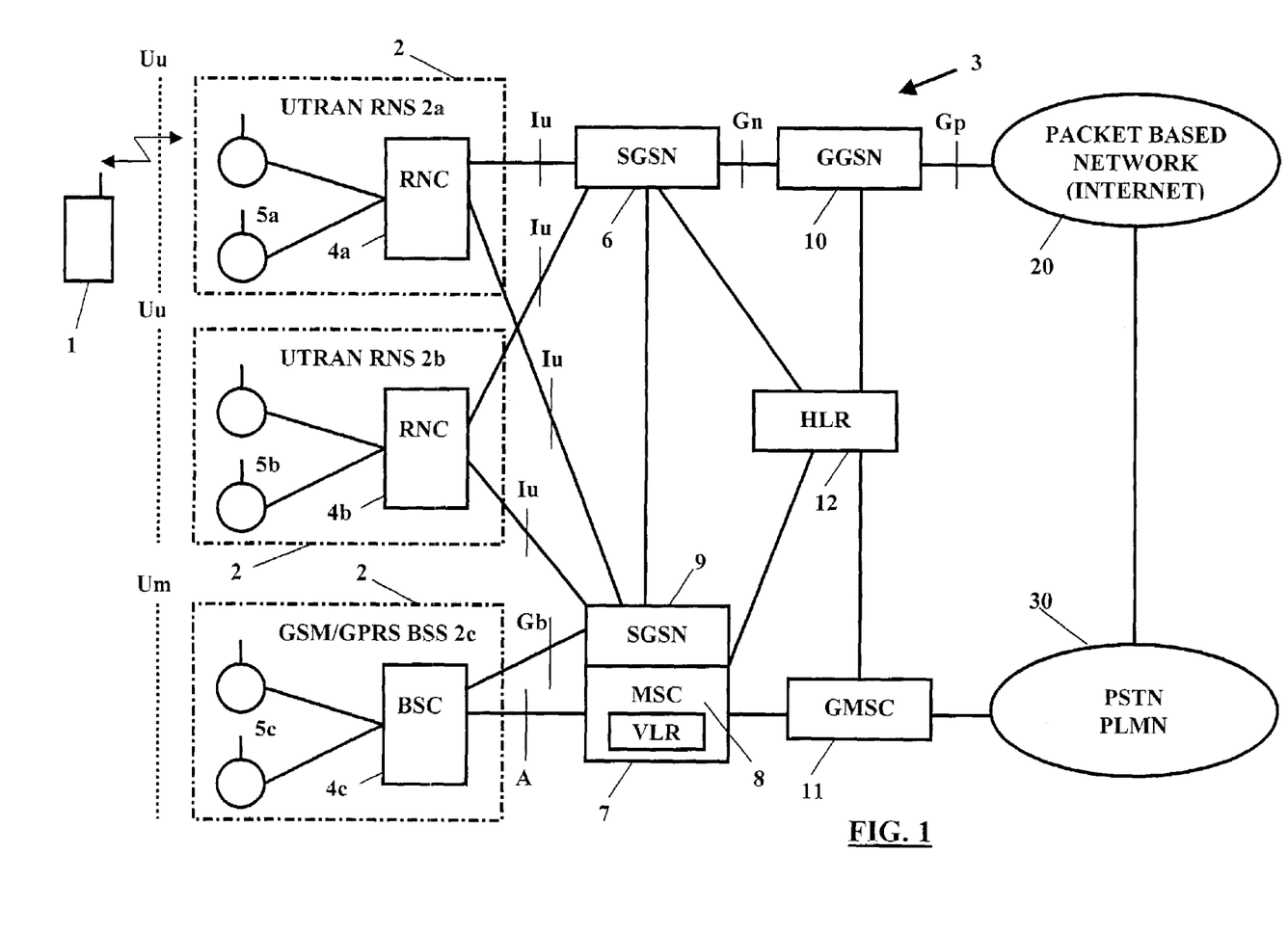
FIG. 1 shows a block diagram illustrating a communication network in which the connection management mechanism of the invention is implemented.

FIG. 1 is a block diagram illustrating a communication network in which the invention may be employed.

In the illustrated communication network, a GSM/GPRS/UMTS structure is illustrated. However, it is to be noted that the illustrated communication network is only an example for the implementation of the invention. Other network solutions having a similar architecture and/or further combinations of network solutions may also be applicable.

According to FIG. 1, the cellular GSM/GPRS/UMTS telecommunication network provides both packet switched (PS) services and circuit switched (CS) services for a user equipment (UE) 1 which reside in $2^{nd}$ generation (GSM/GPRS) and $3^{rd}$ generation (UMTS) structures. In this example, the UE 1 performs simultaneously CS and PS communications. However, also other user equipment which are able to perform only one communication type are usable. Even though only one UE 1 is shown, the communication network is able to provide service to a plurality of user equipments at a time. The UE 1 communicates with the communication system transceiver stations through respective wireless connections/interfaces. The transceiver stations are able to communicate within a respective cell area/areas in uplink/downlink directions in order to transmit and receive data to and from the UE 1 located in the transceiver station's cell(s).

The illustrated communication network comprises a core network (CN) 3, access networks 2 (UTRAN and GSM/GPRS access networks) comprising respective access network subsystems 2, i.e. UTRAN RNS 2a, 2b, and GSM/GPRS BSS 2c. Respective interfaces between the various elements, the access network subsystems and the core network are provided and are described in more detail herein below.

The CN 3 may have connections to external networks, such as circuit switched networks 30 (e.g. public land mobile network PLMN, public circuit switched network PSTN, integrated services digital network ISDN) or packet based networks 20 (e.g. Internet protocol (IP) based data networks).

As mentioned above, the CN of FIG. 1 includes both UMTS elements and GSM elements. The illustrated communication network according to FIG. 1 represents a simplified illustration which may actually include several further network elements which are known and not essential for understanding the invention. In FIG. 1, the CN 3 includes a Home Location Register (HLR) 12 as a subscriber data register, a Mobile Services Switching Center (MSC) 8 comprising a Visitor Location Register (VLR), a SGSN 9 of the GPRS system, a SGSN 6 of the UMTS system, a Gateway GPRS Support Node (GGSN) 10, and a Gateway Mobile Services Switching Center (GMSC) 11. The SGSN 9 and the MSC/VLR 8 are shown as forming one CN control element 7. However, these elements can by also separated. Furthermore, it is also possible that the functions of the SGSNs 6 and 9 are integrated in one SGSN element.

The access networks of the communication network of FIG. 1 comprise UTRAN and GSM/GPRS systems 2. In the illustrated example, the UTRAN system is composed of two RNS 2a and 2b. Each of the RNS 2a, 2b is composed of a radio access controller (RNC) 4a, 4b, and one or more transceiver stations (Node B) 5a, 5b which are connected to the respective RNC 4a, 4b and covering respective cells. Similarly, the GSM/GPRS access network is composed of a BSS 2c which comprises a BSC 4c and one or more base transceiver stations (BTS) 5c. The functions of the BTS 5c and the Node Bs 5a, 5b may also be included in one transceiver element. The access networks 2 may comprise a different number of access network subsystems than shown. Also, the access network subsystems may comprise a different number of transceiver stations than shown. Furthermore, there may be provided further access network subsystems 2 in the communication network, which can be of the same types described above or of other types (for example, GSM only, or the like).

The function of the access network controllers RNC and BSC is to control of the radio resources of the UTRAN and the GSM/GPRS access network subsystems, respectively. For example, the RNC interfaces the CN 3 and also terminates the Radio Resource Control (RRC) protocol that defines the messages and procedures between the UE 1 and the UTRAN RNS. It is to be noted that also other control nodes may be used for the implementation of the radio network control function.

The UE 1 may be a terminal apparatus of different type. For example, the UE 1 may be a mobile phone, a mobile laptop computer, a personal digital assistant (PDA) or the like. Irrespective of its specific type, the UE 1 may comprise several means (not shown) which are required for its communication functionality. Such means are for example a processor unit for executing instructions and processing data for the communication connection (for example transmission content and signaling related data), memory means for storing instructions and data, for serving as a work area of the processor and the like (e.g. ROM, RAM, EEPROM, and the like), input means for inputting data and instructions by software (for example floppy diskette, CD-ROM, EEPROM, and the like), user interface means for providing monitor and manipulation possibilities to a user (for example a screen, a keyboard, a microphone and headset for communication, and the like), and network interface means for establishing a communication connection under the control of the processor unit (for example wireless interface means, an antenna, and the like). These means can be integrated within one device (for example in the case of a mobile telephone) or in several devices forming the user equipment (for example in the case of a laptop).

Similarly, the control elements used in the access network subsystems 2 as well as in the CN 3 (such as the RNC, BSC, SGSN, MSC, and the like) may comprise several means (not shown) which are required for its control and communication functionality. Such means are for example a processor unit for executing instructions and processing data for the communication connection (for example transmission content and signaling related data), memory means for storing instructions and data, for serving as a work area of the processor and the like (for example ROM, RAM, EEPROM, and the like), input means for inputting data and instructions by software (for example floppy diskette, CD-ROM, EEPROM, and the like), user interface means for providing monitor and manipulation possibilities to a user (for example a screen, a keyboard and the like), and interface means for establishing a communication connection under the control of the processor unit (for example wireless interface means, an antenna, and the like).

Now, interfaces used for connections of the communication network elements in FIG. 1 are described.

The UE 1 may be connected to the transceiver station of the cell in which it is located by means of an Uu interface (in the case of a UTRAN Node B 5a, 5b) or an Um interface (in the case of a GSM/GPRS BTS 5c). In the UTRAN RNS, the interface between the Node Bs 5a, 5b and the corresponding RNC 4a, 4b may be provided by means of an Iub interface. In the GSM/GPRS BSS 2c, the interface between the BTSs 5c and the BSC 4c may be provided by an Abis interface. The interface between the SGSN nodes 6 and 9 of the CN 3 and the UTRAN RNSs 2a, 2b may be provided by a so-called Iu interface (Iu-PS (packet switched) interface). The interface between the UTRAN RNSs 2a, 2b and the MSC/VLR 8 may be provided by an Iu interface (Iu-CS (circuit switched) interface). The interface between the BSS 2c and the SGSN 9 may be provided by a Gb interface providing the packet switched part of the GSM/GPRS system. The interface between the BSS 2c and the MSC/VLR 8 may be provided by an A interface. In FIG. 1 each of the access network controllers 4a, 4b, 4c has a simultaneous PS and CS connection with the nodes of the CN 3. However, in other network structures it is also possible that an access network controller is connected only to one node of the CN 3.

On the CN side, the respective network elements are connected by means of a plurality of interfaces. In order to simplify matters, only those interfaces are mentioned below which are useful for understanding the proposed solution. The SGSN in the CN 3 may be connected to the GGSN 10 via a Gn interface. The GGSN 10 may be connected to the external packet based network 20 via a Gp interface. The connection between the MSC/VLR 8 and the SGSN 6, 9 may be provided by a Gs interface.

Now, a connection management function implemented in the above described communication network is described with reference to FIG. 2.

Generally, according to the invention for a communication management, the core network determines whether the user equipment which was connected hitherto to the core network via a specific signaling connection of a specific access network subsystem, is still reachable via this specific signaling connection or even via this access network subsystem at all when a connection release procedure is to be performed. For example, a core network control element receives and processes signaling information (i.e. received messages) related to the user equipment, which was hitherto connected to the core network via the interface to the specific access network subsystem by means of a signaling connection, via an interface to another access network subsystem (step S10). During the processing of this received signaling, the core network may determine that the connection to the user equipment via the hitherto access network subsystem is to be ended, that is the hitherto signaling path and correspondingly allocated resources of the communication network are to be released. Furthermore, during this processing, also the source of the user equipment related signaling is recognized, for example, on the basis of the used interface/signaling connection over which the signaling is received. Then, it is determined in the core network whether or not the user equipment can be assumed to be still reachable by the old access network subsystem through the hitherto signaling path, that is beyond the interface to the hitherto access network (step S20). If the result of the determination is yes (step S30), that is it can be assumed that the user equipment is still reachable by the old access network subsystem, the core network may perform normal processing and signaling to the access network subsystem, for example, in order to initiate a connection release such as described in connection with FIG. 3. On the other hand, when the result of the determination is no (step S30), that is the hitherto access network subsystem is assumed by the core network to have no means to reach the user equipment anymore, a specific indication element is generated which indicates the result of the core network that the user equipment can not be reached by the access network subsystem, at least via the hitherto signaling connections. This indication element is transmitted to the hitherto access network, for example to the corresponding access network controller (step S50), for example, in connection with a connection release command which is to be sent due to the determination of an end of the communication session of the user equipment via the hitherto signaling path. When the hitherto access network, for example the corresponding controller, receives and recognizes this indication element, for example by processing the transmitted connection release command from the core network, it can determine that there are no means to reach the user equipment, for example via the interface to the user equipment with which it was initially connected (step S60) or via the hitherto signaling connection with which the user equipment and the access network subsystem were connected for this session. Therefore, a normally performed signaling/communication to the user equipment through this interface or via the hitherto signaling connection, for example for a paging trial or for performing a release procedure between the hitherto access network and the user equipment, is recognized to be not successful and may thus be prevented by the access network controller (step S70). On the other hand, the connection release procedure for the signaling connection related to the user equipment's session between the hitherto access network subsystem and the core network may be normally executed in order to release connections and resources related to the user equipment.

As to the determination of whether the user equipment is reachable beyond the hitherto interface between the core network and the old access network, this may be based on different events and processing results at the core network side. For example, the hitherto communication session (signaling path) of the user equipment is to be released due to a completion of transaction between the user equipment and the core network, due to access network (for example UTRAN) generated reasons such as a release request from the access network control element (for example due to an unspecified failure, user inactivity, loss of radio connection with user equipment and the like), due to the completion of a successful relocation of the serving access network subsystem, or the like. For example, the control element of the core network being involved in the session of the user equipment, such as a SGSN or MSC, can make the decision "user equipment is not anymore reachable by the access network beyond the old access network/core network interface (which is to be released)" in case the trigger for ending the hitherto connection of the user equipment to the core network (for example for a corresponding release procedure) is that the user equipment has informed itself via another access network/core network interface. This means, for example, that already the type of the access network/core network interface via which the core network control element receives the signaling related to the user equipment can be used for the decision that the user equipment is not reachable. For example, signaling via the Gb-interface in case of a 2G-3G-SGSN indicates that the user equipment which was hitherto connected via an Iu interface to UTRAN is not reachable beyond the (old) Iu interface. Another example for a user equipment not reachable by the hitherto UTRAN is a signaling via the Gn/Gp-interface from a gateway node such as GGSN which indicates that another core network control element (another SGSN) is now connected to the user equipment which in turn means that another access network subsystem is used. Even if the core network control element receives a user equipment related signaling by means of an interface to another access network subsystem of the same type, for example by another Iu interface to another RNS, this may indicate that the user equipment is not reachable anymore beyond the hitherto Iu interface. The basis for such a decision may be improved, for example, by using a table or the like stored in the involved core network control element. This table may store for each connected access network subsystem those adjacent access network subsystem in whose areas the respective (old) connected access network subsystem can still reach a user equipment. When an identifier or the like of the new access network subsystem received by the signaling related to the user equipment does not match with the access network subsystems stored in the table, the core network control element can decide that the user equipment is not reachable anymore beyond the hitherto access network/core network interface. Another additional case for the determination, for example when the CN side knows that the user equipment is not reachable beyond the very Iu signaling connection to be released now, can arise when, for example, the UE and the RNC create a new Iu signaling connection to the core network although an (old) Iu signaling connection in the same CN element already is existent. This is possible in a case when the UE, during an out-of-coverage situation, has gone locally into "idle" while the state of the UE in the network side is still "connected". In such a case the CN notices that there exists an old "relic" Iu connection. Then the CN side initiates the release of that relic Iu connection by a corresponding Iu release command. In such a case it is advantageous that RNC is informed by the indication element that the "UE is not reachable" (beyond this very connection).

Hence, the CN side (i.e. the respective CN control element) can make the decision "UE is not anymore reachable by the access network subsystem beyond the old interface (signaling connection to be released)", for example, in cases when the trigger for the connection release command (such as the Iu release) is that the UE has informed itself via another access network-core network interface of the same type (e.g. Iu) or via another access network-core network interface (e.g. Gb in 2G-3G-SGSN) or via a core network interface (e.g. Gn/Gp via another SGSN).

As to the specific indication element used for indicating the determination result to the access network subsystem controller (e.g. BSC, RNC), there may be used new information, such as a cause code, which may be included in an existing signaling message, such as an interface release command message or the like. Alternatively, the meaning/interpretation of already existing information, such as existing cause codes in signaling messages, can be clarified for a usage as the specific indication element. Furthermore, the specific indication element can also be a separate indicator transmitted to the access network. Only as one example, cause codes included the 3GPP RANAP signaling according to the 3GPP TS 25.413 signaling is to be mentioned.

The invention can be implemented, for example, by means of software functions to be included in the core network control elements (determination of reachability of user equipment, generation of indication element) and the access network control elements (recognition of indication element, prevention of signaling). However, also corresponding hardware solutions can be implemented. In a preferred application example, control elements such as SGSN, MSC (core network side) and RNC, BSC (access network side) in a cellular 2G-3G communication network are equipped with the communication management mechanism of the invention.

Figure 2:
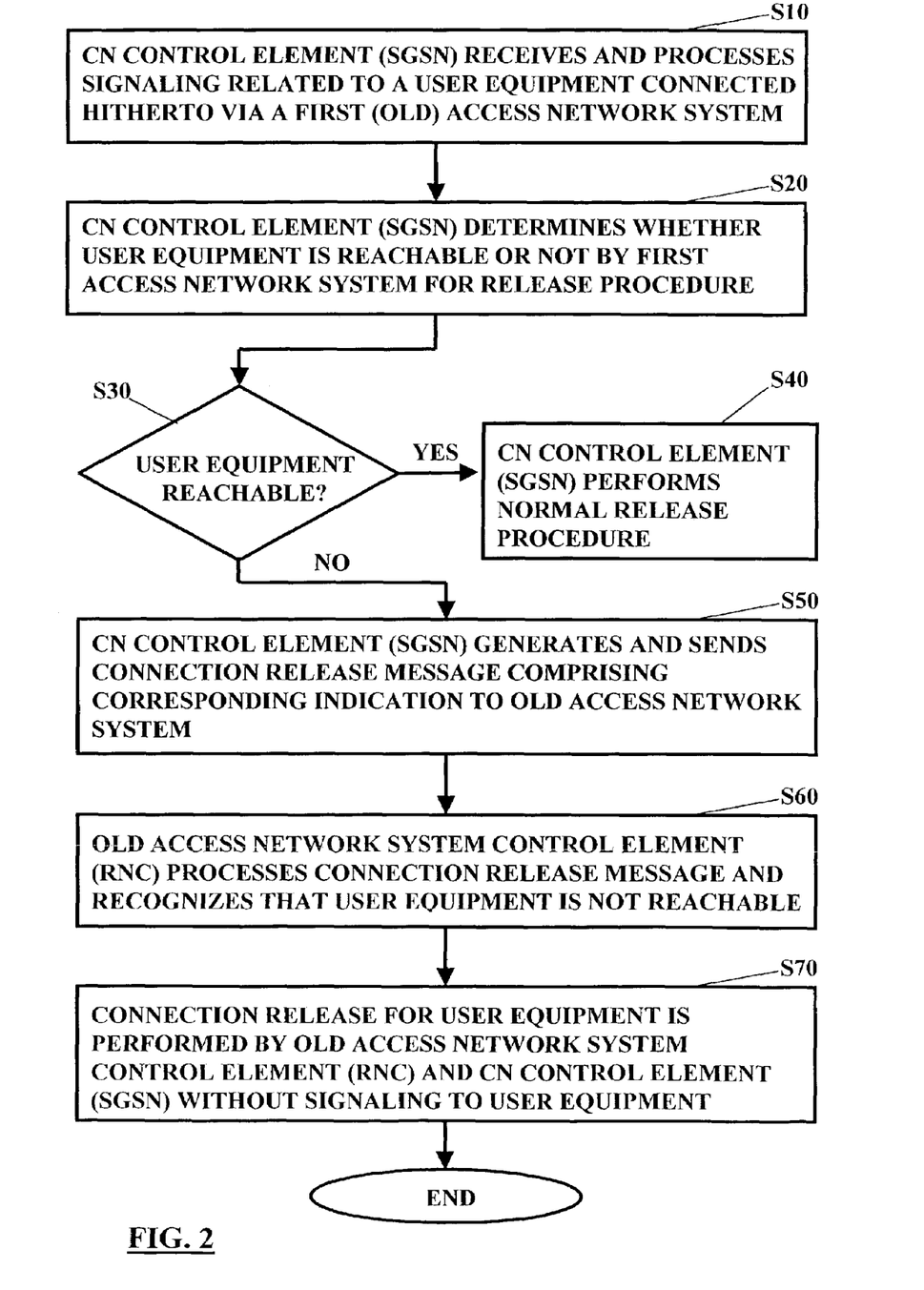
FIG. 2 shows a flow chart illustrating a method of performing a connection management according to the invention.

Now, as an illustrating example, with reference to FIGS. 1 and 2 a situation can be assumed in which the UE 1 is initially connected to the communication network of FIG. 1 by an UMTS connection, for example a PS connection, through the UTRAN RNS 2a with a PS control element of the CN 3, for example the SGSN 6. Thus, in the communication network, communication resources for the connection of the UE 1 along the (simplified) signaling path UE 1→Uu interface→Node B 5a→RNC 4a→Iu (PS) interface→SGSN 6 are provided. In other words, the SGSN 6 knows via which access network subsystem (that is through which Iu interface and RNC) the UE 1 is reachable.

When the session between the UE 1 and the CN 3 via the hitherto signaling path (for this session) is to be ended, the CN control element, in the present example the SGSN 6, executes a release procedure for the connections and resources related to the connection of the UE 1. The trigger for such a release procedure by the CN 3 may be, for example, a signaling related to the UE 1 which the SGSN 6 receives due to a cell reselection of the UE 1 when the UE 1 moves in common channel state or in idle state to the $2^{nd}$ generation network part of the communication network of FIG. 1, i.e. to the coverage area of the BSS 2c. While the original access network subsystem, that is the UTRAN RNS 2a, may not be aware about this event, the CN 3 recognizes that the UE 1 has moved, for example, on the basis of a recognition of a UE 1 related signaling via the Gb interface from the BSC 4c. The UE 1 may now be connected through a signaling path UE 1→Um interface→BTS 5c→BSC 4c→Gb interface→SGSN 9 (or 6). By recognizing the now used access network interface type, the CN 3 control elements (for example the SGSN) is able to determine that the hitherto UTRAN RNS 2a has no means to reach the UE 1. Therefore, the SGSN 6 generates an indication element indicating the fact that the UE 1 is not reachable anymore, and includes this indication element in a signaling message to the hitherto UTRAN RNS 2a (for example to the RNC 4a) transmitted via the Iu interface thereto. In the present example, the indication element may be a specific cause code included in the RANAP Iu release command message which is sent to the RNC 4a due to the determination of a connection and resource release of the old connection between the UE 1 and the CN 3 (UE 1→Uu interface→Node B 2a→RNC 4a→Iu (PS) interface→SGSN 6).

When the RNC 4a receives the RANAP Iu release command message, it recognizes the cause code (indication element). In response to this cause code, the RNC 4a prevents any signaling to the UE 1 from the UTRAN RNS 2a (that is from Node B 5a and Uu interface), such a RRC connection release message, paging trials, and the like. The RNC 4a clears and releases the resources and interfaces (RABs, Uu interface, Iu interface) which where hitherto allocated to the UE 1 session in the RNS 2a. Then, the release command from the CN 3 is replied by the RNC 4a, for example, with a RANAP Iu release complete message. When the CN 3, for example the SGSN 6, receives RANAP Iu release complete message, the release procedure of the UE 1 connection is terminated in the CN 3.

Further examples for a determination in the CN 3 that the UE 1 is not reachable anymore beyond the old Iu interface (to RNS 2a) are given below.

When the cell reselection is executed in the $3^{rd}$ generation environment, for example the UE 1 moves to UTRAN RNS 2b, the SGSN 6 recognizes UE 1 related signaling via the Iu interface to the RNC 2b. When the CN 3 knows that the RNS 2a has no means to communicate with the UE 1 in the RNS 2a area, the above described procedure is executed.

When the UE 1 moves to an access network subsystem controlled by another (new) SGSN, for example a 3G-SGSN, the (old) SGSN receives for example a GTP (PGRS Tunneling Protocol) SGSN Context Request from the new SGSN. Then, the old SGSN knows that the UE 1 is not anymore reachable beyond the hitherto Iu interface towards which the old SGSN is going to send, for example, the Iu release command message. Hence, the indication element is included in the message.

In case of a 3G-SGSN, the fact whether the UE 1 is now connected to the $2^{nd}$ generation part of the communication network or not can also be noted by means of the presence of a TLLI (Temporary Logical Link Identity) instead of P-TMSI (Packet-Temporary Mobil Subscriber Identity) in the in the GTP SGSN Context Request.

There may also be the case that a second signaling connection from one UE is established in case there is an "unsync" situation between the UE-RRC-state in the UE and UE-RRC-state in the RNC. For example, the UE-RRC has gone "idle" due to the case "out radio coverage" while the RNC-RRC is still in the "connected mode". When the UE starts to update its location (for example a routing area update), the UE starts, due to the above described states, to create a new signaling connection (path) first. When the CN notices, when the new connection path is established, that there already exists a signaling connection for that UE, the CN control element can release the old signaling connection, for example by a Iu Release Command. Also in that case there is no need (RNC must not) to try to communicate (with intention of release) with the UE.

As mentioned above in the described example, the trigger for the release procedure by the CN may be, for example, a signaling related to the UE which the SGSN receives due to a cell reselection of the UE when the UE moves in common channel state or in idle state to the $2^{nd}$ generation network part of the communication network. While the original access network subsystem may not be aware about this event, the CN recognizes that the UE has moved. Further examples where such a situation may occur are for example when there is no dedicated radio link (but the UE is in common channel states, for example cell_FACH (Forward Access CHannel), cell_PCH, URA_PCH (User Registration Area)) between the RAN and the UE and when there is no "very recent" relocation type of RANAP and/or RRC signaling. Then the RAN does not know the reachability situation for the UE. In the coverage area of one access network subsystem (i.e. of one RNC, for example) there can be thousands of connected mode UEs which are monitoring common channels (PCH or FACH) and informs itself just periodically (intervals may be several hours).

It is to be noted that the invention is applicable in a similar or equivalent way for other connection types, for example a CS connection of the UE 1 in the communication network according to FIG. 1, or in cases where more than one connection type is simultaneously used, for example a simultaneous CS and PS connection.

Even though the above described example is based on a GSM/GPRS/UMTS communication network, it should be understood that the communication management of the invention is also applicable to various other types of communication systems or networks as long as a control element of the network is able to recognize that a user equipment is not reachable anymore by a hitherto access subsystem and the access network controller knows in which case the a communication or signaling trial to the user equipment is not successful anymore and thus to be prevented.

As described above, there is a communication management mechanism for a communication network, such as a cellular multi-type communication network, in which the core network determines whether a user equipment, which was connected hitherto to the core network via an access network subsystem, is still reachable via a signaling connection to this specific access network subsystem when a connection release procedure is to be performed. When it is determined that the access network subsystem is assumed by the core network to have no means to reach via a hitherto signaling connection the user equipment anymore, a specific indication element is generated which indicates the result of the core network that the user equipment can not be reached by the access network subsystem via this hitherto signaling connection. This indication element is transmitted to the access network, for example, in connection with a connection release command. The access network recognizes this indication element and determines that there are no means to reach the user equipment via the hitherto signaling connection. Due to this, normally performed unsuccessful signaling trials to the user equipment may be prevented.

It should be understood that the above description and accompanying figures are merely intended to illustrate the present invention by way of example only. The described embodiments of the present invention may thus vary within the scope of the attached claims.

The invention claimed is:

1. A method of managing a communication connection of a user equipment in a communication network, the method comprises the steps of:
processing received signaling information related to the user equipment in order to determine whether or not the user equipment is still reachable via at least one first signaling connection for an access network subsystem through which the user equipment was connected hitherto; and
sending, if the user equipment is not reachable, a specific indication element to the access network subsystem, wherein the specific indication element indicates that the user equipment is not reachable for the access network subsystem via the at least one first signaling connection, and
wherein the determination is based on detecting that signaling related to the user equipment is forwarded via at least one of the following: a different access network, a different interface and a different signaling connection, wherein the specific indication element is included in a connection release message to release at least one second signaling connection of the user equipment to a core network subsystem, and wherein the specific indication element is a specific cause code in a signaling message.

2. The method according to claim 1, wherein the signaling message is transmitted from a second control means to a first control means of the access network subsystem via a respective second interface.

3. The method according to claim 1, wherein the specific indication element is transmitted to a first control means of the access network subsystem by means of a connection release message for releasing at least one second signaling connection of the user equipment to the core network subsystem via a second interface.

4. The method according to claim 1, comprising a step of preventing, in the access network subsystem, a communication to the user equipment through the at least one first signaling connection via a first interface in response to the receipt of the specific indication element.

5. The method according to claim 1, comprising a step of releasing, by a first control means, connection resources related to the communication connection of the user equipment.

6. The method according to claim 1, wherein in the processing step the determination that the user equipment is not reachable for the access network subsystem via the at least one first signaling connection is performed by detecting that a signaling related to the user equipment is forwarded via an interface between the core network subsystem and an access network subsystem being different to the access network subsystem.

7. The method according to claim 1, wherein in the processing step the determination that the user equipment is not reachable for the access network subsystem via the at least one first signaling connection is performed by detecting that a signaling related to the user equipment is forwarded via a third interface between a second control means of the core network subsystem and other core network subsystem's control means.

8. The method according to claim 1, wherein in the processing step the determination that the user equipment is not reachable for the access network subsystem via the at least one first signaling connection is performed by detecting that a signaling related to the user equipment is forwarded via a second interface between the core network subsystem and a same access network subsystem by another second signaling connection.

9. The method according to claim 1, wherein the communication network subsystem comprises universal mobile telecommunications system functionality, wherein the core network subsystem's control means comprise a serving general packet radio service support node entity, the access network subsystems comprise at least one of universal mobile telecommunications system terrestrial radio access network, global systems for mobile communications access network subsystems and combinations thereof, and the access network subsystem's control means comprise base station controllers and radio network controllers, respectively, wherein the user equipment communicates with at least one of the universal mobile telecommunications system terrestrial radio access network and global systems for mobile communications access network subsystems.

10. A system for managing a communication connection of a user equipment in a communication network, the system comprises:
a processing unit configured to process received signaling information related to the user equipment, the processing unit determines whether or not the user equipment is still reachable via an at least one first signaling connection for an access network subsystem through which the user equipment was connected;
wherein, if the user equipment is not reachable, a specific indication element is generated by the processing unit and transmitted to the access network subsystem, wherein the specific indication element indicates that the user equipment is not reachable for the access network subsystem via the at least one first signaling connection, wherein the determination is based on detecting that signaling related to the user equipment is forwarded via at least one of the following: a different access network, a different interface and a different signaling connection, wherein the specific indication element is included in a connection release message to release at least one second signaling connection of the user equipment to a core network subsystem, and wherein the specific indication element is a specific cause code in a signaling message.

11. The system according to claim 10, wherein the signaling message is transmitted from a second control unit to a first control unit of the access network subsystem via a respective second interface.

12. The system according to claim 10, wherein the specific indication element is transmitted to a first control unit of the access network subsystem by a connection release message to release at least one second signaling connection of the user equipment to the core network subsystem via a second interface.

13. The system according to claim 10, wherein a first control unit of the access network subsystem prevents a communication to the user equipment through the at least one first signaling connection via a first interface in response to the receipt of the specific indication element.

14. The system according to claim 10, wherein a first control unit releases connection resources related to a communication connection of the user equipment.

15. The system according to claim 10, wherein the processing unit determines that the user equipment is not reachable for the access network subsystem via at least one first signaling connection by detecting that a signaling related to the user equipment is forwarded via an interface between the core network subsystem and an access network subsystem being different to the access network subsystem.

16. The system according to claim 10, wherein the processing unit determines that the user equipment is not reachable for the access network subsystem via at least one first signaling connection by detecting that a signaling related to the user equipment is forwarded via a third interface between a second control unit of the core network subsystem and other core network subsystem's control unit.

17. The system according to claim 10, wherein the processing unit determines that the user equipment is not reachable for the access network subsystem via at least one first signaling connection by detecting that a signaling related to the user equipment is forwarded via a second interface between the core network subsystem and the same access network subsystem by another second signaling connection.

18. The system according to claim 10, wherein the communication network subsystem comprises universal mobile telecommunications system functionality, wherein the core network subsystem's control unit comprises a serving general packet radio service support node entity, the access network subsystems comprise at least one of universal mobile telecommunications system terrestrial radio access network, global system for mobile communication access network subsystems and combinations thereof, and the access network subsystem's control unit, comprises base station controllers and radio network controllers, respectively, wherein the user equipment communicates with at least one of the universal mobile telecommunications system terrestrial radio access network and global system for mobile communications access network subsystems.

19. A core network device usable for managing a communication connection of a user equipment in a communication network, the core network device is configured to:

process received signaling information related to the user equipment in order to determine whether or not the user equipment is still reachable via at least one first signaling connection for an access network subsystem through which the user equipment was connected hitherto;

wherein, if the user equipment is not reachable a specific indication element is generated and transmitted to the access network subsystem, wherein the specific indication element indicates that the user equipment is not reachable for the access network subsystem via the at least one first signaling connection, wherein the determination is based on detecting that signaling related to the user equipment is forwarded via at least one of the following: a different access network, a different interface and a different signaling connection, wherein the specific indication element is included in a connection release message to release at least one second signaling connection of the user equipment to a core network subsystem, and wherein the specific indication element is a specific cause code in a signaling message.

20. A core network device according to claim 19, wherein signaling message is transmitted from a second control means to a first control means of the access network subsystem via a respective second interface.

21. A core network device according to claim 19, wherein the specific indication element is transmitted to a first control means of the access network subsystem by means of a connection release message for releasing at least one second signaling connection of the user equipment to the core network subsystem via a second interface.

22. A core network device according to claim 19, wherein the specific indication element results in a prevention of a communication from a first control unit of an access network subsystem to the user equipment through the at least one first signaling connection via a first interface.

23. A core network device according to claim 19, wherein the core network device determines that the user equipment is not reachable for the access network subsystem via the at least one first signaling connection by detecting that a signaling related to the user equipment is forwarded via an interface between the core network subsystem and an access network subsystem being different to the access network subsystem.

24. A core network device according to claim 19, wherein the core network device determines that the user equipment is not reachable for the access network subsystem via the at least one first signaling connection by detecting that a signaling related to the user equipment is forwarded via a third interface between a second control unit of the core network subsystem and other core network subsystem's control means.

25. A core network device according to claim 19, wherein the core network device determines that the user equipment is not reachable for the access network subsystem via the at least one first signaling connection by detecting that a signaling related to the user equipment is forwarded via a second interface between the core network subsystem and the same access network subsystem by another second signaling connection.

26. A core network device according to claim 19, wherein the communication network subsystem comprises universal mobile telecommunication system UMTS functionality, wherein the core network subsystem's control unit comprises a serving general packet radio service support node entity, the access network subsystems comprise at least one of universal mobile telecommunications system terrestrial radio access network, global system for mobile communication access network subsystems and combinations thereof, and the access network subsystem's control unit comprises base station controllers and radio network controllers, respectively, wherein the user equipment communicates with at least one of the universal mobile telecommunications system terrestrial radio access network and global system for mobile communication access network subsystems.

27. An access network device usable for managing a communication connection of a user equipment in a communication network,
wherein, the access network device is configured to determine that a communication connection related to the user equipment via the at least one first signaling connection is to be terminated and that the user equipment is not reachable via the at least one first signaling connection for an access network subsystem to which the user equipment was connected hitherto, and to transmit a specific indication element to the access network subsystem, wherein the specific indication element indicates that the user equipment is not reachable for the access network subsystem via the at least one first signaling connection and prevents a communication to the user equipment through the at least one first signaling connection via a first interface in response to the specific indication element,
wherein the determination is based on detecting that signaling related to the user equipment is forwarded via at least one of the following: a different access network, a different interface and a different signaling connection,
wherein the specific indication element is included in a connection release message to release at least one second signaling connection of the user equipment to a core network subsystem, and wherein the specific indication element is a specific cause code in a signaling message.

28. An access network device according to claim 27, wherein the signaling message is transmitted from a second control unit to a first control unit of the access network subsystem via a respective second interface.

29. The access network device according to claim 27, wherein the specific indication element is transmitted to a first control unit of the access network subsystem by a connection release message to release the at least one second signaling connection of the user equipment to the core network subsystem via a second interface.

30. The access network device according to claim 27, wherein the access network device releases connection resources related to the communication connection of the user equipment.

31. The access network device according to claim 27, wherein the communication network subsystem comprises universal mobile telecommunication system functionality, wherein the core network subsystem's control unit comprises a serving general packet radio service support node entity, the access network subsystems comprise at least one of universal mobile telecommunications system terrestrial radio access network, global system for radio communications GSM access network subsystems and combinations thereof, and the access network subsystem's control unit comprises base station controllers and radio network controllers, respectively, wherein the user equipment communicates with at least one of the universal mobile telecommunications system terrestrial radio access network and global system for mobile communications (GSM) access network subsystems.

* * * * *